United States Patent [19]

Koshimo

[11] Patent Number: 4,576,260
[45] Date of Patent: Mar. 18, 1986

[54] LOCK-UP CLUTCH OF A TORQUE CONVERTER

[75] Inventor: Masahiko Koshimo, Higashi-Osaka, Japan

[73] Assignee: Kabushiki Kaisha Daikin Seisakusho, Neyagawa, Japan

[21] Appl. No.: 543,645

[22] Filed: Oct. 19, 1983

[30] Foreign Application Priority Data

Oct. 20, 1982 [JP] Japan .................. 57-185691

[51] Int. Cl.$^4$ .................. F16H 45/02; F16D 3/14; F16D 3/66
[52] U.S. Cl. .................. 192/3.31; 192/3.29; 192/70.17; 192/106.2; 464/68
[58] Field of Search .................. 192/3.29, 3.3, 3.31, 192/70.17, 106.2; 464/68

[56] References Cited

U.S. PATENT DOCUMENTS

| | | | |
|---|---|---|---|
| 4,027,757 | 6/1977 | Radke et al. | 192/3.29 X |
| 4,143,561 | 3/1979 | Melhorn | 464/68 X |
| 4,220,233 | 9/1980 | Ban et al. | 464/68 X |
| 4,382,496 | 5/1983 | Yamamori et al. | 192/3.29 |
| 4,470,494 | 9/1984 | Takeuchi | 464/68 X |
| 4,485,909 | 12/1984 | Gatewood | 464/68 X |
| 4,494,642 | 1/1985 | Hashimoto | 464/68 X |

FOREIGN PATENT DOCUMENTS

| | | | |
|---|---|---|---|
| 02447 | 6/1979 | European Pat. Off. | 192/3.29 |
| 2076908 | 12/1981 | United Kingdom | 192/3.29 |

Primary Examiner—Allan D. Herrmann
Attorney, Agent, or Firm—Armstrong, Nikaido, Marmelstein & Kubovcik

[57] ABSTRACT

The present invention discloses a lock-up clutch of a torque converter comprising a disc hub adapted to be connected slidably only in an axial direction to a turbine hub of a torque converter and having a radial flange, a pair of annular side plates disposed at both sides of the hub flange, plural torsion springs disposed in openings and hollows in the hub flange and the side plates for connecting the side plates to the hub flange, each or each set of the springs being adapted to engage at both ends thereof with the side plates and the hub flange, a friction portion provided on a radially outer portion of the side plate and adapted to be axially pressed to an inner surface of a front cover of the torque converter, and a forcing means for forcing and pressing the friction portion to the front cover.

5 Claims, 6 Drawing Figures

4,576,260

LOCK-UP CLUTCH OF A TORQUE CONVERTER

BACKGROUND OF THE INVENTION

The present invention relates to a lock-up clutch provided in a torque converter for automobiles or the like.

Generally, a lock-up clutch of a torque converter is designed to directly connect an input portion and an output portion of the torque converter together when a speed ratio of the input and output portions is nearly 1:1. By the use of the lock-up clutch, a torque transmission efficiency of the torque converter can be increased. However, in the conventional lock-up clutch, a piston-clutch plate connectable to the input portion of the torque converter and a damper disc connected to the output shaft are separately disposed. The clutch plate and the disc are axially aligned and are designed to be connected together. Therefore, the lock-up clutch has a large axial size, which undesirably increases the size of the torque converter.

Accordingly, it is an object of the invention to provide an improved lock-up clutch ,overcoming the above disadvantage.

The essence of the present invention is to provide a lock-up clutch, wherein a side plate itself or a damper disc is adapted to be pressed to an input portion of a torque converter.

Other and further objects, features and advantages of the invention will appear more fully from the following description of the preferred embodiments of the invention.

DETAILED DESCRIPTION OF THE PREFERRED EMBODIMENTS

Figure 1:
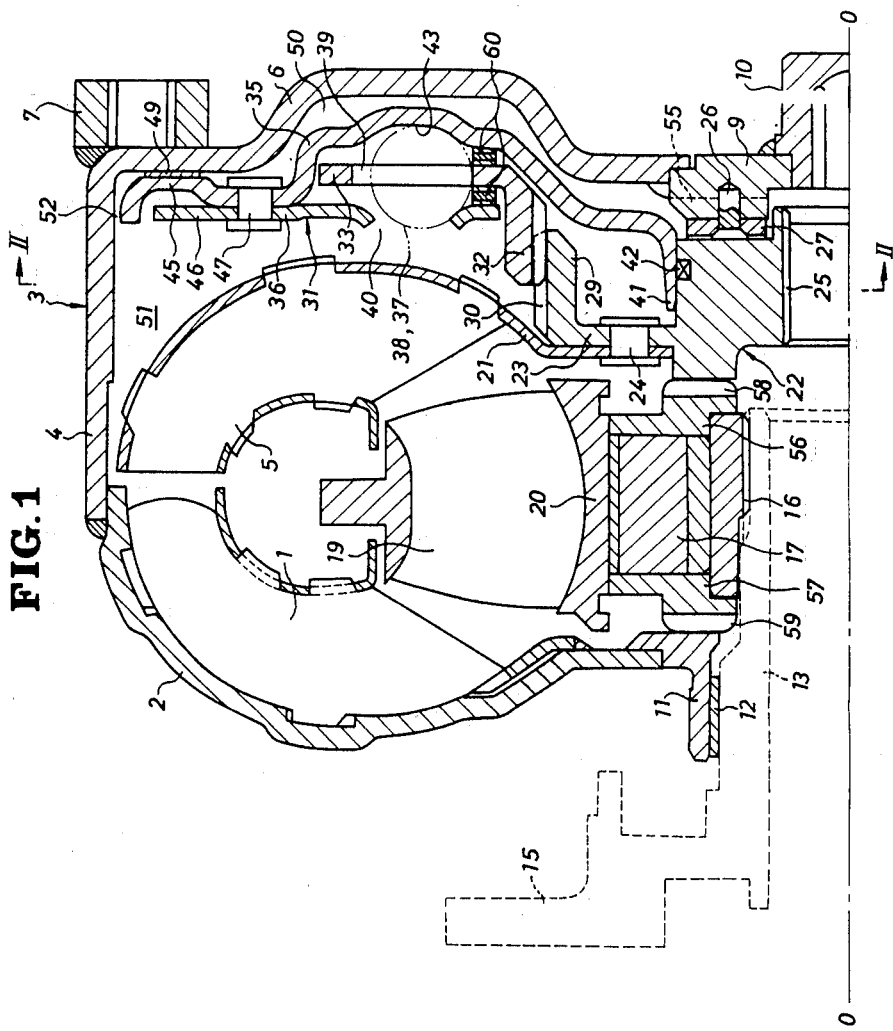
FIG. 1 is a sectional partial view of a torque converter including a lock-up clutch according to the invention.

Referring to FIG. 1, a pump impeller 1 of a torque converter has a shell 2, of which an outer end portion is attached or welded to an end portion of a cylindrical outer wall 4 of a front cover 3. The cover 3 has an annular end wall 6 which covers a rear side (opposite side to the impeller 1) of a turbine 5. Plural nut-like bosses 7 are welded to radially outer portions of the end wall 6. The bosses 7 are fixed to a flywheel (not shown) of an engine by bolts. An annular boss 9 is welded to the inner periphery of the end wall 6. A guide shaft 10 is welded to the inner periphery of the boss 9. The inner periphery of the impeller shell 2 is welded to an annular hub 11, of which cylindrical portion is supported by the outer peripheral surface of the stationary shaft 13 through a bush 12. At the left end in FIG. 1, the stationary shaft 13 is provided with a radial outward flange 15 which is fixed to a transmission case (not shown) or the like. The shaft 13 is provided at its other end with a spline teeth to which a cylindrical boss 16 is splined. The outer peripheral surface of the boss 16 supports a shell 20 or a boss of a stator 19 through an one-way clutch 17.

An annular flange 23 is fixed by rivets 24 to an inner peripheral portion of a shell 21 of the turbine 5. The flange 23 is provided at the outer periphery of a turbine hub 22. The hub 22 is splined at its inner spline teeth 25 to an end of an output shaft (not shown). The center of the output shaft is indicated by a line 0—0. Other end of the output shaft is connected to an input portion of the transmission. A thrust washer 27 is disposed between the boss 22 and said boss 9 and is fixed by a pin 26 to the boss 9. A cylindrical portion 29 coaxial with the output shaft center 0—0 is projected from the outer peripheral portion of the flange 23 toward the end wall 6. The cylindrical portion 29 is provided at its outer periphery with spline teeth 30, to which a cylindrical hub 32 of a clutch disc 31 is splined slidably only in the axial direction.

In the disc 31, a pair of annular plates 35 and 36 are disposed at both sides of a radial flange 33 of the hub 32. The flange 33 and the plates 35 and 36 are connected through torsion springs 37 and 38. The structues of the disc 31 will be described more in detail hereinafter.

The flange 33 projects radially outwardly from the end portion of the hub 32 near the end wall 6. The flange 33 is provided at its radially middle portions with openings 39 in which the torsion springs 37 and 38 are disposed. The side plate 36 is disposed between the flange 33 and the turbine shell 21, and is provided with openings 40 axially registered with the openings 39. Other side plate 35 is disposed between the flange 33 and the end wall 6, and is provided with hollows 43 axially registered with the openings 39. The plate 35 is provided at its inner periphery with a cylindrical portion 41 which rotatably fits in sealed condition with a seal ring 42 disposed in an outer peripheral groove of the turbine boss 22. The outer peripheral portions 45 and 46 of the plates 35 and 36 extend radially outwardly beyond the flange 33 and are fixed closely together by rivets 47. At the radially outer portion with respect to the rivets 47, an annular friction plate 49 or facing which faces to the wall 6 is fixed to the outer peripheral portion 45 of the plate 35.

Hydraulic chamber 50 and 51 are formed at both sides of the side plate 35. A space 52 is formed between the plate 35 and the outer wall 4 of the front cover. The side plate 35 is not provided with an aperture or a recess through which both chambers 50 and 51 are connected, so that the plate 35 forms a piston which is operable to axially shift by a difference of the pressures in the chambers 50 and 51. The friction plate 49 closes the space 52 with respect to the chamber 50 when it is pressed to the end wall 6 as shown in FIG. 1. The boss 9 at the inner periphery of the wall 6 is provided with an oil passage 55 connected to the chamber 50. The passage 55 is also connected to a hydraulic source (not shown) through another passage and a control valve. Annular members 56 and 57 are disposed at both sides of the one-way clutch and are provided with oil passages 58 and 59 connected to the chamber 51. The passages 58 and 59 are also connected to the hydraulic source through another passage and a control valve (not shown). One or both of the passages 58 and 59 may be eliminated.

Instead of the passages 58 and 59, the passage 55 may be eliminated. The above control valves are connected to a hydraulic pressure controlling device having a sensor detecting an opening degree of an accelerator device and other sensor. The hydraulic pressure controlling device is operable to adjust the opening degrees of the control valves to relatively change the pressures in the chambers 50 and 51, so that the pressures in the chamber 51 may be relatively increased when the ratio of the rotation speed of the impeller 1 to that of the turbine 5 approaches to a value of 1:1.

Friction means 60 such as friction washers and/or wave springs are disposed in compressed condition between the inner peripheral portion of the flange 33 and both side plates 35 and 36.

Figure 2:
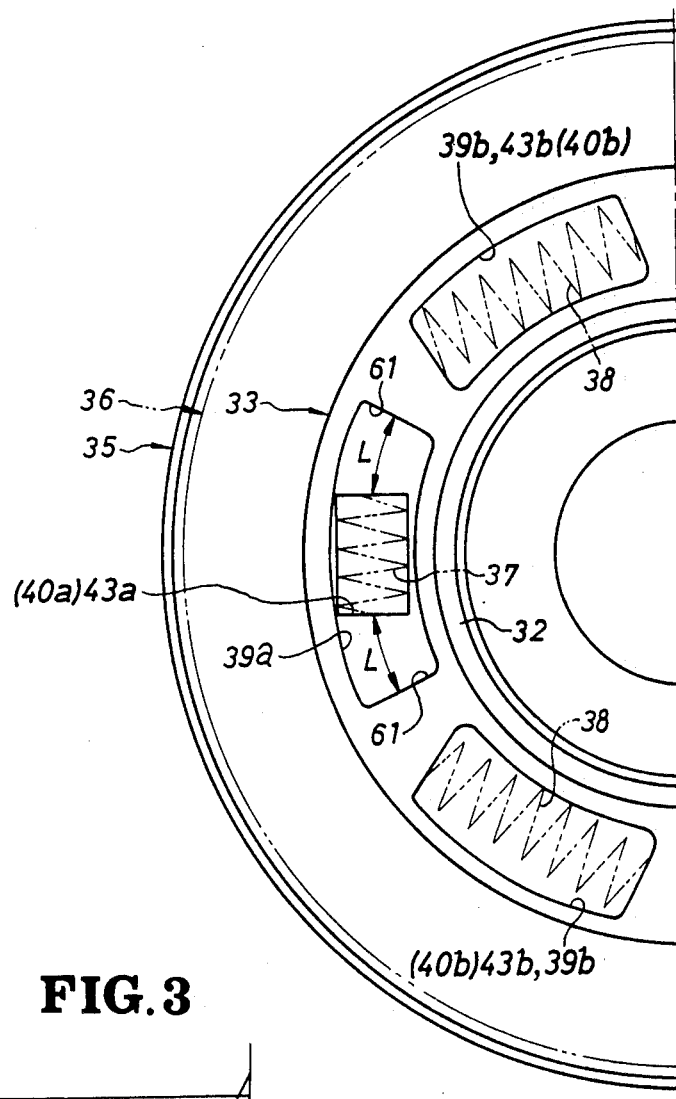
FIG. 2 is a partially cut away view of the lock-up clutch taken in the direction of the arrow II—II in FIG. 1.
Figure 3:
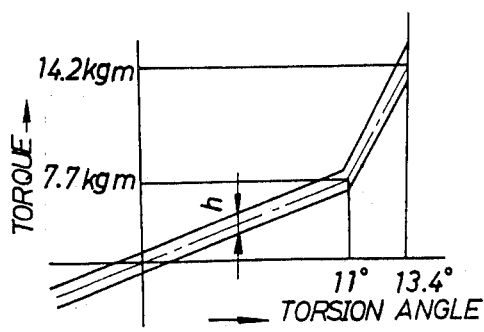
FIG. 3 is a graph showing a transmitted torque-torsion angle characteristic.

Referring to FIG. 2, said openings 39 (39a and 39b) in the flange 33 are six in number and are circumferentially equally spaced to each other. Both plates 35 and 36 are respectively provided with six hollows 43 (43a and 43b) and the six openings 40 (40a and 40b). Two openings 39a have same and circumferentially long shape. Other four opneings 39b have same and circumferentially short shape. Four pairs of the hollows 43b and openings 40b axially registered to the short openings 39b have same circumferential length as the openings 39b, respectively. Two pairs of the hollows 43a and 40a axially registered to the openings 39a are circumferentially shorter than the openings 39a. One short torsion spring 37 is engaged in each pair of the short hollow 43a and opening 40a. In the illustrated condition in which the side plates 35 and 36 do not torsionally turn relatively to the flange 33, both ends of each spring 37 are pressed to the side edges of the opening 40a and the end faces of the hollow 43a, and are apart from the side edges 61 of the opening 39a in the flange 33 with circumferential spaces L corresponding to torsion angle of 11°. One torsion spring 38 is engaged in each set of the hollow 43b and openings 40b and 39b. In the illustrated position, both ends of the springs 38 are pressed to the side edges of the openings 39b and 40b and the end faces of the hollows 43b.

One of the specific functions or operations of the disc can be as follows. In FIG. 1, when the pressure in the chamber 51 is relatively increased by said hydraulic pressure controlling device to force the side plate 35 toward the end wall 6, the whole disc 31 moves on the spline teeth 30 toward the end wall 6, so that the friction plate 49 is pressed to the end wall 6. Thus, the front cover 3 is connected to the turbine hub 22 through the disc 31, i.e., the lock-up clutch is engaged, and the torque from the flywheel is transmitted to the output shaft through the wall 6, the friction plate 49, the side plates 35 and 36, the torsion springs 37 and 38, the flange 33, the hub 32 and the hub 22.

In the above operation, the springs 37 and 38 are compressed by the force corresponding to the transmitted torque so that the plates 35 and 36 torsionally turn relatively to the flange 22. Before the torsion angle increases to a value of 11°, the springs 37 in FIG. 2 do not contact with the side edges 61 of the openings, so that only the springs 38 are compressed. Thus, the increasing rate of the torsion angle with respect to the transmitted torque is large. When the torsion angle increases over the value of 11°, the springs 37 are pressed to the side edges 61, and there-by, are compressed. Thus, the increasing rate of the torsion angle relative to the transmitted torque becomes small. When the torsion angle increases to a value of 13.4°, the springs 37 and 38 are fully compressed, so that further torsion is prevented. The above torsion motion causes sliding on the surfaces of the friction means 60, so that a hysteresis torque h corresponding to the friction force by the sliding is added to the torque-torsion angle characteristic. The above torsion motion and the hysteresis torque h absorb the vibration in the transmitted torque.

When the hydraulic pressure controlling device relatively decreases the pressure in the chamber 51, the side plate 35 is pushed back by the pressure in the chamber 50, so that the whole disc 31 moves toward the turbine 5. Thus, the friction plate 49 moves away from the end wall 6, and the clutch is released. In this condition, the power of the engine is transmitted from the impeller 1 to the turbine 5 through the working oil.

According to the invention, as stated hereinbefore, the clutch has following structures. Namely, The disc hub 32 is connected slidably only in the axial direction to the turbine hub 22. The radial hub flange 33 of the disc hub 32 is connected through the torsion springs 37 and 38 to the annular side plates 35 and 36 disposed at both sides of the flange 33. The friction plate 49 adapted to be axially pressed to the inner surface of the front cover 3 is provided on the surface of the radially outer portion of the side plate 35. The clutch is also provided with the forcing means (the hydraulic chambers 50 and 51, the control valve and others) operable to press the friction plate 49 to the front cover 3. As apparent from the above, the side plate 35 of the disc 31 also fuctions as the piston-clutch plate to be pressed to the front cover 3. Therefore, a conventional piston-clutch plate which functions only as the piston-clutch plate is not necessary to be disposed between the side plate 35 and the wall 6. This results in such advantages that the axial size of the lock-up clutch can be short, and that the lock-up clutch can easily be assembled in a narrow space in the torque converter. Further, since the number of the parts is small, the assembling process can be simple, which also makes it easy to assemble the clutch in the torque converter.

In the illustrated embodiment, each of the springs 37 and 38 is fitted in each set of the openings 39 and 40 and hollows 43 in the flange 33 and the side plates 36 and 35. And the respective ends of the springs 37 and 38 are adapted to be pressed by the edges and end surface of the openings 39 and 40 and hollows 43. Therefore, it is not necessary to provide parts used only for preventing drop out of the springs 37 and 38, which also results in the simple construction.

In a modification of the invention, elastic rubbers may be used as a part or all of the springs 37 and 38. A set of coaxially arranged compressible coil springs of large and small diameters may be substituted for each of the torsion springs 37 and 38.

Figure 4:
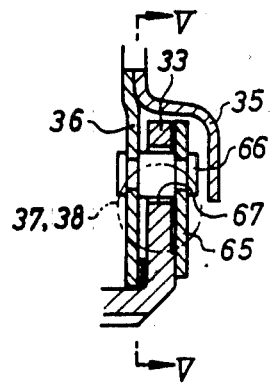
FIG. 4 is a sectional partial view of other embodiment.
Figure 5:
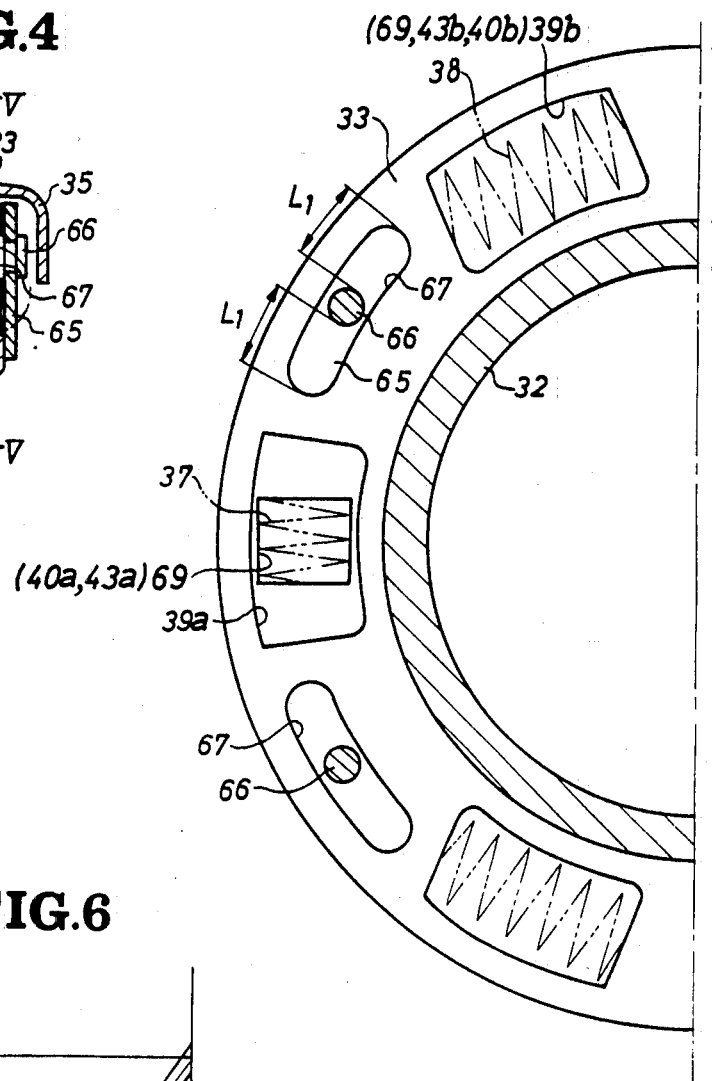
FIG. 5 is a sectional partial view taken in line V—V in FIG. 4.

A modification in FIGS. 4 and 5 may be employed. In FIG. 4, an annular sub-plate 65 is disposed between the flange 33 and the side plate 35. The sub-plate 65 has substantially same inner and outer diameters as the flange 33. Radially outer portions of the sub-plate 65 are ridigly connected to the side plate 36 by stop pins 66 which extend through long apertures 67 formed in the flange 33, respectively. Referring to FIG. 5, the apertures 67 are four in number, and are formed at circumferentially both sides of the openings 39a for the spring 37. Each aperture 67 is long in the circumferential direction of the disc.

In the illustrated non-torsion condition, there is a space L corresponding to a torsion angle of 10.5° between each pin 66 and each inner edge or end of the aperture 67. The sub-plate 65 has openings 69 having same circumferential lengthes as the openings 40a and 40b of the side plate 36. In the nontorsion condition, both ends of the springs 37 and 38 are pressed to the edges of the openings 69. The sub-plate 65 is not designed to prevent the springs 37 and 38 from disengaging rightward in FIG. 4. This disengagement is prevented by the side plate 35. The disengagement in the opposite direction is prevented by the side plate 36.

Figure 6:
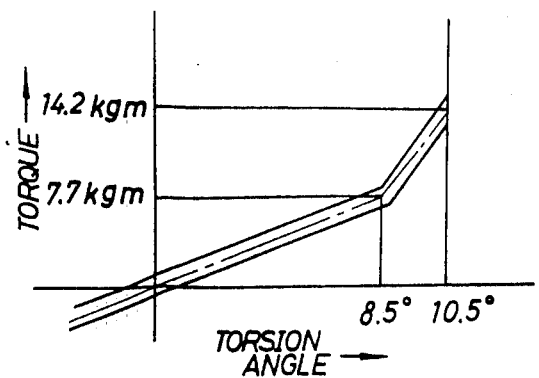
FIG. 6 is a graph showning a transmitted torque-torsion angle characteristic of the embodiment of FIGS. 4 and 5.

In this embodiment, the sizes of the openings 39a and others are so determined that the springs 37 are compressed when the torsion angle increases over a value of 8.5° as shown in FIG. 6. When the torsion angle increases to a maximum value of 10.5°, the stop pins 66 contact the edges of the apertures 67, so that the side plates 35 and 36 are prevented from further torsional movement with respect to flange 33 and thus, the springs 37 and 38 will not be fully compressed.

Although the invention has been described in its preferred form with a certain degree of particularlity, it is understood that the present disclosure of the preferred from may be changed in the details of construction and the combination and arrangement of parts may be resorted to without departing from the spirit and scope of the invention as hereinafter claimed.

What is claimed is:

1. A lock-up clutch of a torque converter comprising a disc hub adapted to be connected slidably only in an axial direction to a turbine hub of a torque converter and having a radial hub flange, a pair of annular side plates disposed at both sides of the hub flange, a plurality of torsion springs arranged in sets disposed in openings and hollows in the hub flange and the side plates for connecting the side plates to the hub flange, each set of torsion springs being adapted to engage at both ends thereof with the side plates and the hub flange, a friction portion provided on a radially outer portion of one of said annular side plates and adapted to be axially pressed to an inner surface of a front cover of the torque converter, and a forcing means for forcing and pressing the friction portion to said front cover.

2. A lock-up clutch of a torque converter of claim 1 wherein said friction portion is operable to be pressed to the front cover in a hydraulically sealed condition, the side plate having the friction portion is provided with an inner periphery which is slidably connected to the turbine hub in a hydraulically sealed condition, and said forcing means is provided with a hydraulic chamber which is positioned at one or both sides of the side plate having the friction portion so that hydraulic pressure will move said side plate.

3. A lock-up clutch of torque converter of claim 2 wherein the rotating speed ratio of an impeller and a turbine of said torque converter is detected and used to hydraulically actuate said forcing means.

4. A lock-up clutch of a torque converter of claim 1 wherein the circumferential lengthes of the openings and the hollows of the hub flange and the side plates are so determined that one or some of the torsion springs are compressed in all of the torsion area and that other torsion springs are compressed only in a torsion area over a predetermined torsion angle.

5. A lock-up clutch of a torque converter of claim 1 wherein a sub-plate having openings for said torsion springs is disposed between the hub flange and one of the side plates, and is connected to the other side plate by a stop pin which passes through a recess formed in the flange, and a circumferential space corresponding to a maximum torsion angle is formed between the stop pin and the recess.

* * * * *